United States Patent [19]

Sommer

[11] Patent Number: 5,473,718
[45] Date of Patent: Dec. 5, 1995

[54] FIBER OPTIC LOOSE TUBE BUFFER TO FAN-OUT TUBE ADAPTER SYSTEM

[75] Inventor: Keith E. Sommer, Satellite Beach, Fla.

[73] Assignee: The United States of America as represented by the Secretary of the Navy, Washington, D.C.

[21] Appl. No.: 309,523

[22] Filed: Sep. 20, 1994

[51] Int. Cl.6 ........................................ G02B 6/36
[52] U.S. Cl. .................. 385/87; 385/86; 385/76; 385/77; 385/100; 385/109; 385/136; 385/137
[58] Field of Search .................... 385/53, 54, 66, 385/62, 63, 69, 76, 77, 84, 86, 87, 115, 121, 136, 137, 139, 100, 109, 113

[56] References Cited

U.S. PATENT DOCUMENTS

| | | | |
|---|---|---|---|
| 3,457,000 | 7/1969 | Genahr | 385/86 X |
| 4,153,332 | 5/1979 | Longini | 385/113 X |
| 4,626,067 | 12/1986 | Watson | 385/86 X |
| 4,697,873 | 10/1987 | Bouvard et al. | 385/86 X |
| 4,746,187 | 5/1988 | Flores | 385/87 X |
| 5,048,918 | 9/1991 | Daems et al. | 385/86 |
| 5,125,060 | 6/1992 | Edmundson | 385/100 |
| 5,185,840 | 2/1993 | Iapicco | 385/100 |
| 5,210,812 | 5/1995 | Nilsson et aL. | 385/100 |
| 5,212,750 | 5/1993 | Wright | 385/69 |

*Primary Examiner*—Brian Healy
*Attorney, Agent, or Firm*—Charles D. Miller

[57] ABSTRACT

An adapter system protects optical fibers transitioning from a close-pack configuration within a rigid loose tube buffer to a fanned-out configuration using fan-out tube assemblies. Each fan-out tube assembly includes a hollow furcation tube surrounded firstly by a stranded strength member and secondly by an outer jacket surrounding the stranded strength member. The adapter system includes a first sleeve secured to an end of the loose tube buffer, a second sleeve joinable to the first sleeve, a first spacer plate incorporated in the second sleeve, and a second spacer plate maintained within the second sleeve and spaced apart from the first spacer plate. Each optical fiber exits the end of the loose tube buffer and is inserted through a furcation tube from a fan-out tube assembly such that the optical fibers are maintained in a spaced apart configuration when passing through the first and second spacer plates of the adapter system.

10 Claims, 2 Drawing Sheets

FIBER OPTIC LOOSE TUBE BUFFER TO FAN-OUT TUBE ADAPTER SYSTEM

The invention described herein may be manufactured and used by or for the Government of the United States of America for governmental purposes without payment of any royalties thereon or therefor.

FIELD OF THE INVENTION

The invention relates generally to fiber optic adapters, and more particularly to an adapter system for protecting optical fibers transitioning from a close-pack configuration within a rigid loose tube buffer to a fanned-out configuration using fan-out tubes.

BACKGROUND OF THE INVENTION

Bundled optical fibers are often maintained in a close-pack configuration within a metal sheathing known as a loose tube buffer. In order to make connections to individual ones of the optical fibers, the loose tube buffer must be partially cut or stripped away to expose the optical fibers. Each of the individually exposed fibers is then protected with what is known in the art as fan-out tubing. Typical fan-out tubing consists of a rugged inner tube (for receiving the optical fiber) surrounded by strength member (e.g., stranded metal or Kevlar wire) and an outer jacket (e.g., PVC material). It is desirable to protect each of the optical fibers in the transition from loose tube buffer to fan-out tubing.

SUMMARY OF THE INVENTION

Accordingly, it is an object of the present invention to provide an adapter system for protecting optical fibers in transition from a close-pack configuration within a rigid loose tube buffer to a fanned-out configuration using fan-out tubing.

Other objects and advantages of the present invention will become more obvious hereinafter in the specification and drawings.

In accordance with the present invention, an adapter system protects optical fibers transitioning from a close-pack configuration within a rigid loose tube buffer to a fanned-out configuration using fan-out tube assemblies. Each fan-out tube assembly includes a hollow furcation tube surrounded firstly by a stranded strength member and secondly by an outer jacket surrounding the stranded strength member. The adapter system includes a first sleeve secured to an end of the loose tube buffer, a second sleeve joinable to the first sleeve, a first spacer plate incorporated in the second sleeve, and a second spacer plate maintained within the second sleeve and spaced apart from the first spacer plate. The first spacer plate is provided with spaced apart holes, each of which is sized to receive therethrough one furcation tube from a corresponding fan-out tube assembly. The second spacer plate is also provided with spaced apart holes aligned with the holes of the first spacer plate. Each hole in the second spacer plate is sized to receive one fan-out tube assembly such that the stranded strength member and outer jacket associated with each fan-out tube assembly terminates between the first and second spacer plates while the furcation tube associated with each fan-out tube assembly extends through a corresponding one of the holes in the first spacer plate. Each optical fiber exits the end of the loose tube buffer and is inserted through one of the furcation tubes from the fan-out tube assemblies such that the optical fibers are maintained in a spaced apart configuration when passing through the first and second spacer plates.

DETAILED DESCRIPTION OF THE INVENTION

Figure 1:
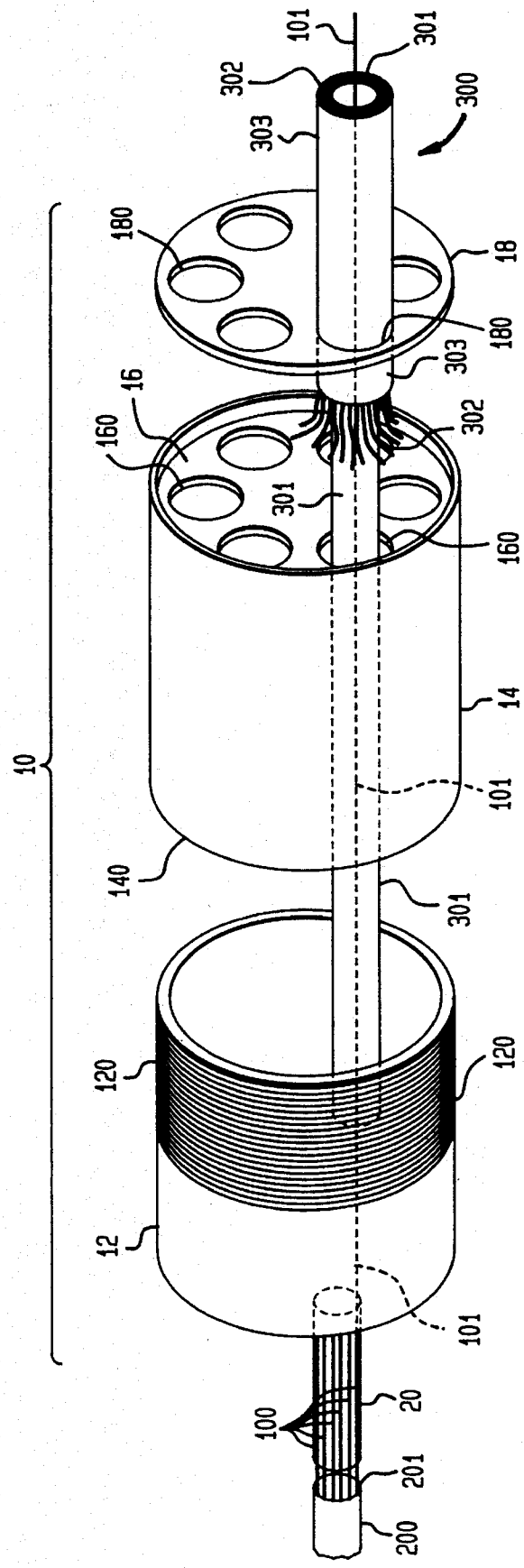
FIG. 1 is an exploded perspective view of the fiber optic loose tube buffer to fan-out adapter system according to a preferred embodiment of the present invention.

Referring now to the drawings, and more particularly to FIG. 1, an exploded perspective view is shown of adapter system 10 according to a preferred embodiment of the present invention. As will be explained below, adapter system 10 protects optical fibers 100 that are being transitioned from a close-pack configuration within rigid loose tube buffer 200 to a fanned-out configuration in which each of optical fibers 100 broken out from end 201 of loose tube buffer 200 is fed through a fan-out tube, one of which is shown and referenced generally by the numeral 300. While six optical fibers 100 are shown, the present invention is easily adapted to more or less optical fibers. Further, for ease of illustration and simplicity of description, FIG. 1 depicts the use of adapter system 10 as it relates to only one optical fiber 101 that transitions from loose tube buffer 200 to fan-out tube 300 while being protected by adapter system 10. Fan-out tube 300 can be any one of a variety of conventional fan-out tubes that includes a rugged furcation tube 301 surrounded immediately by stranded strength member 302 and secondarily by outer jacket 303.

Adapter system 10 includes extension sleeve 12, adapter sleeve 14 having sleeve spacer plate 16 mounted therein (or integral therewith), and spacer plate 18. Additionally, adapter system 10 can include shrink tubing 20 for bundling optical fibers 100 just after end 201 of loose tube buffer 200. This can be done to keep optical fibers 100 away from end 201 which can be rough enough to damage optical fibers 100.

Extension sleeve 12 is fit over end 201 and secured onto loose tube buffer 200 by compression fit, crimping, or a compression fit using a ferrule system. Extension sleeve 12 incorporates threads 120 on its exterior for threaded engagement with threads (not shown) on an inside wall of adapter sleeve 14. Methods other then threading can be used to fit 12 to 14 such as; epoxy bonding or snap-fit. One such type of fitting suitable for use as extension sleeve 12 (that includes threads 120 on its exterior) is the male portion of a Swagelok tube fitting available from Swagelok Corporation.

As mentioned above, adapter sleeve 14 is threaded (not shown) on it interior near end 140 to mate with threads 120. Adapter sleeve 14 also incorporates sleeve spacer plate 16 fixed within or made integral with adapter sleeve 14 by any conventional means, e.g., welding, molding, screwed, machined from a single piece, etc. Sleeve spacer plate 16 defines a plurality (e.g., six to accommodate six optical fibers 100) of holes 160, each of which is sized to accommodate the circumference of function tube 301. Holes 160 are arranged about spacer plate 16 to define a break-out or spaced apart configuration for optical fibers 100.

Spacer plate 18 defines a similar plurality of holes 180, each of which is sized to accommodate the circumference of the entirety of fan-out tube 300. When assembled into adapter system 10, holes 160 and holes 180 are aligned with one another. Since holes 160 in adapter spacer plate 16 can only accommodate the circumference of furcation tube 301, stranded strength member 302 and outer jacket 303 are terminated between adapter spacer plate 16 and spacer plate 18. The importance of configuring adapter system 10 in this manner will be explained below.

Figure 2:
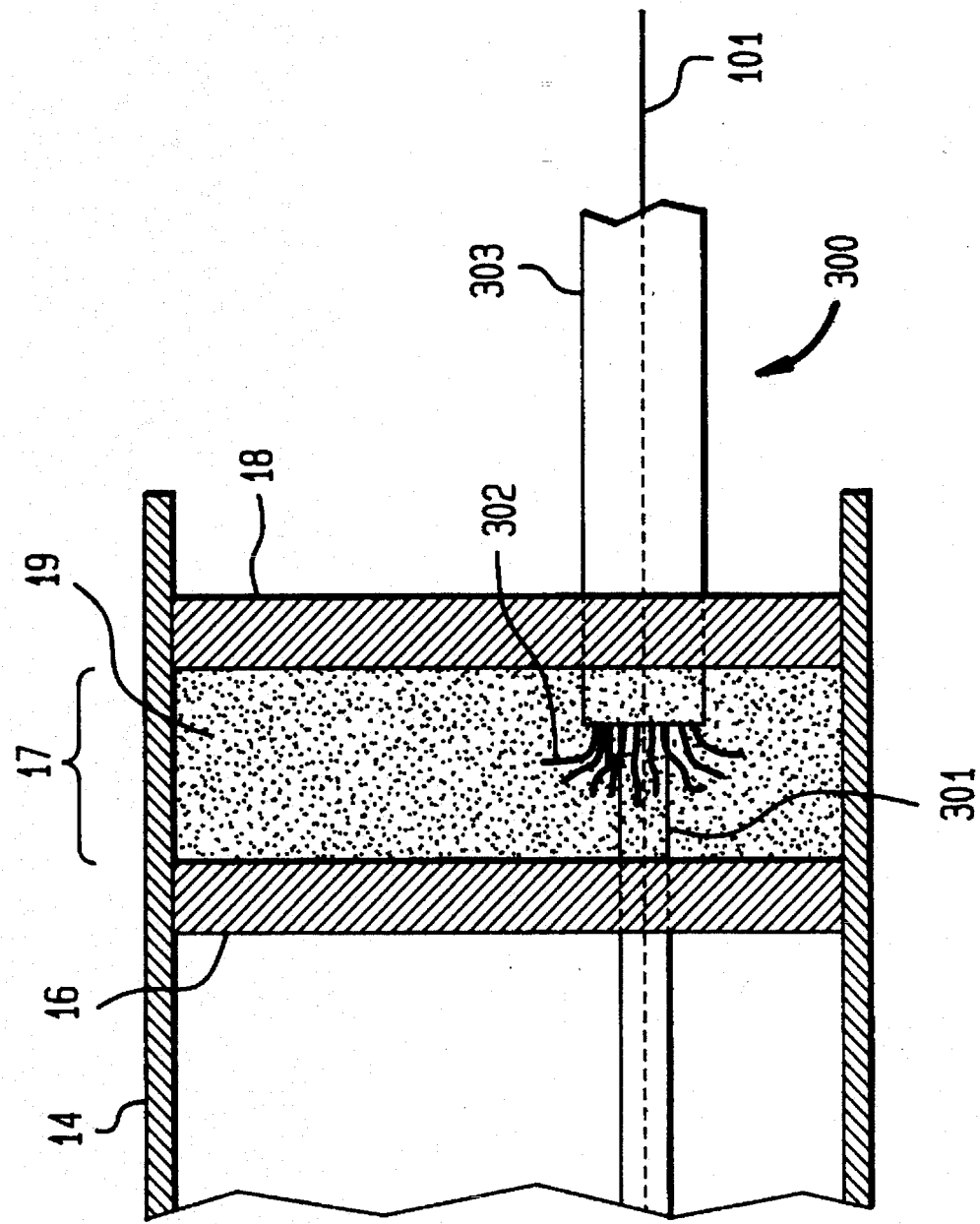
FIG. 2 is a side, cross-sectional view of a portion of the adapter system shown in FIG. 1, wherein the portion depicts the relationship between the two spacer plates after they are assembled within the adapter sleeve.

To assemble adapter system 10 in accordance with the preferred embodiment, loose tube buffer 200 is cut away to expose a sufficient length of optical fibers 100 that will extend through adapter system 10 and the associated fan-out tube 300. Shrink tubing 20 is then applied about optical fibers 100 near end 201. Fan-out tube 300 is prepared by stripping away outer jacket 303 and stranded strength member 302 to expose a length of furcation tube 301. Since adapter sleeve 14 is threaded on its interior, the exposed length of furcation tube 301 extends through sleeve space plate 16/adapter sleeve 14 and into (the smooth interior surface of) extension sleeve 12. In this way, optical fiber 101 is protected against contact with any sharp or rough surface within adapter system 10, e.g., the threads on the interior of adapter sleeve 14. The exposed length of furcation tube 301 is led through spacer plate 18, adapter spacer plate 16, adapter sleeve 14 and into extension sleeve 12 as shown such that the entire circumference of fan-out tube 300 passes through spacer plate 18. Spacer plate 18 is then fit into adapter sleeve 14. This is shown in the cross-sectional view of FIG. 2 which depicts the relationship between adapter spacer plate 16 and spacer plate 18 assembled within adapter sleeve 14. Spacer plate 18 is set within adapter sleeve 14 such that gap 17 exists between adapter spacer plate 16 and spacer plate 18. Epoxy potting compound 19 is used to fill gap 17 and serves to bond: 1) adapter spacer plate 16 to spacer plate 18, and 2) fan-out tube 300 to adapter system 10 via the portion of outer jacket 303 and stranded strength member 302 that resides between adapter spacer plate 16 and spacer plate 18.

The advantages of the present invention are numerous. The optical fibers undergoing transition between a loose tube buffer and fan-out tubes are completely isolated from any tension occurring in either the loose tube buffer or the fan-out tube. This is because tension is passed directly between the loose tube buffer and the outer jacket of the fan-out tube by means of the present invention adapter system. The design of the present invention is easily implemented since it simply acts as an extension between the protective features of the loose tube buffer and the protective features of a fan-out tube. Further, the present invention is readily adapted to any number of optical fibers and/or break-out configurations.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed is:

1. An adapter system for protecting a plurality of optical fibers when said plurality of optical fibers is transitioned from a close-pack configuration within a rigid loose tube buffer to a fanned-out configuration using a plurality of fan-out tube assemblies, each of said plurality of fan-out tube assemblies including a hollow furcation tube surrounded firstly by a stranded strength member and secondly by an outer jacket surrounding said stranded strength member, said adapter system comprising:

a first sleeve secured to an end of said loose tube buffer by a compressor type fit, wherein said plurality of optical fibers exit said end;

a second sleeve joinable to said first sleeve;

a first spacer plate incorporated in said second sleeve and provided with a first plurality of spaced apart holes, each of said first plurality of spaced apart holes sized to receive therethrough one said furcation tube from said plurality of fan-out tube assemblies; and a second spacer plate maintained within said second sleeve and spaced apart from said first spacer plate, said second spacer plate being provided with a second plurality of spaced apart holes aligned with said first plurality of spaced apart holes, each of said second plurality of spaced apart holes sized to receive one of said plurality of fan-out tube assemblies, wherein said stranded strength member and said outer jacket associated with each of said plurality of fan-out tube assemblies terminate between said first spacer plate and said second spacer plate while said furcation tube associated with each of said plurality of fan-out tube assemblies extends through a corresponding one of said first plurality of spaced apart holes in said first spacer plate, wherein each of said plurality of optical fibers exiting said end of said loose tube buffer is inserted through one said furcation tube from said plurality of fan-out tube assemblies such that said plurality of optical fibers are maintained in a spaced apart configuration when passing through said first spacer plate and said second spacer plate.

2. An adapter system as in claim 1 wherein said first sleeve and said second sleeve are joinable by means of threaded engagement.

3. An adapter system as in claim 2 wherein said first sleeve is threaded about an outside wall thereof and said second sleeve is threaded about an inside wall thereof, each said furcation tube from said plurality of fan-out tube assemblies extending through said second sleeve and partially into said first sleeve.

4. An adapter system as in claim 1 further comprising a bonding compound fill between said first spacer plate and said second spacer plate.

5. An adapter system as in claim 1 further comprising means for banding together said plurality of optical fibers exiting said end of said loose tube buffer, said means for banding together being independent from said end of said loose tube buffer.

6. An adapter system as in claim 5 wherein said means for banding together comprises shrink tubing.

7. An adapter system for protecting a plurality of optical fibers when said plurality of optical fibers is transitioned from a close-pack configuration within a rigid loose tube buffer to a fanned-out configuration using a plurality of fan-out tube assemblies, each of said plurality of fan-out tube assemblies including a hollow furcation tube surrounded firstly by a stranded strength member and secondly by an outer jacket surrounding said stranded strength member, said adapter system comprising:

first spacer means secured to an end of said loose tube buffer, wherein said plurality of optical fibers exit said end; and second spacer means spaced apart from said first spacer means for arranging said plurality of fan-out tube assemblies in a spaced apart configuration, wherein said stranded strength member and said outer jacket associated with each of said plurality of fan-out tube assemblies terminate between said first spacer means and said second spacer means while said furcation tube associated with each of said plurality of fan-out tube assemblies extends through said first spacer means in said spaced apart configuration, wherein each of said plurality of optical fibers exiting said end of said loose tube buffer is inserted through one said furcation tube from said plurality of fan-out tube assemblies such that said plurality of optical fibers are maintained in said spaced apart configuration when passing through said first spacer means and said second spacer means.

8. An adapter system as in claim 7 further comprising a bonding compound fill between said first spacer means and said second spacer means.

9. An adapter system as in claim 7 further comprising means for banding together said plurality of optical fibers exiting said end of said loose tube buffer, said means for banding together being independent from said end of said loose tube buffer.

10. An adapter system as in claim 9 wherein said means for banding together comprises shrink tubing.

* * * * *